(12) United States Patent
Martens (10) Patent No.: US 11,825,764 B2
(45) Date of Patent: Nov. 28, 2023

(54) COLLECTION DEVICE FOR METER CALIBRATION OF AIR SEEDER TANKS

(71) Applicant: GREENVALLEY EQUIPMENT (2009) INC., Morden (CA)

(72) Inventor: Wilhelm Martens, Morden (CA)

(*) Notice: Subject to any disclaimer, the term of this patent is extended or adjusted under 35 U.S.C. 154(b) by 204 days.

(21) Appl. No.: 17/342,038

(22) Filed: Jun. 8, 2021

(65) Prior Publication Data
US 2022/0015282 A1    Jan. 20, 2022

Related U.S. Application Data

(60) Provisional application No. 63/051,429, filed on Jul. 14, 2020.

(51) Int. Cl.
*A01C 7/08* (2006.01)
*A01C 7/10* (2006.01)
*A01C 7/20* (2006.01)

(52) U.S. Cl.
CPC .............. *A01C 7/105* (2013.01); *A01C 7/082* (2013.01); *A01C 7/107* (2013.01); *A01C 7/206* (2013.01)

(58) Field of Classification Search
CPC ....................................................... A01C 7/10
See application file for complete search history.

(56) References Cited

U.S. PATENT DOCUMENTS

| | | | | |
|---|---|---|---|---|
| 3,174,807 A * | 3/1965 | Adler | ........................ | B60P 1/58 105/247 |
| 4,351,481 A * | 9/1982 | Dreyer | .................. | E01C 19/203 239/670 |
| 9,043,949 B2 * | 6/2015 | Liu | ......................... | A01C 7/127 |
| 9,326,441 B2 * | 5/2016 | Donadon | ................ | A01C 7/081 |
| 9,781,877 B2 * | 10/2017 | Matrangolo | .......... | A01C 15/005 |
| 2012/0036914 A1 * | 2/2012 | Landphair | .............. | A01C 7/107 73/1.16 |
| 2019/0082586 A1 * | 3/2019 | Harmon | .................. | A01C 7/105 |
| 2019/0289776 A1 * | 9/2019 | Rempel | ................... | A01C 7/107 |
| 2020/0037495 A1 * | 2/2020 | Klein | .................... | A01C 21/002 |
| 2020/0217703 A1 * | 7/2020 | Schumacher | ............ | G01F 3/24 |
| 2021/0127566 A1 * | 5/2021 | Harmon | ................ | A01C 15/007 |
| 2022/0039310 A1 * | 2/2022 | Johnson | ..................... | A01C 1/06 |
| 2022/0232754 A1 * | 7/2022 | Harmon | ............... | A01C 17/006 |
| 2022/0248593 A1 * | 8/2022 | Ryder | ..................... | A01C 7/082 |
| 2022/0312665 A1 * | 10/2022 | Crucianelli | ............ | A01C 7/123 |

FOREIGN PATENT DOCUMENTS

| | | | | |
|---|---|---|---|---|
| EP | 1023823 B1 * | 7/2003 | ............. | A01C 7/082 |
| EP | 3262913 B1 * | 3/2019 | ............... | A01C 7/10 |
| WO | WO-2022056616 A1 * | 3/2022 | | |

* cited by examiner

*Primary Examiner* — Joseph A Dillon, Jr.
(74) *Attorney, Agent, or Firm* — Ryan W. Dupuis; Kyle R. Satterthwaite; Ade & Company Inc.

(57) ABSTRACT

A collection device has a chute supported below the calibration opening on pneumatic delivery lines through which seed can be dispensed during calibration of a seed meter below a seed tank of an agricultural air seeder implement. The chute has a top opening at a top side in alignment with the calibration opening thereabove so as to receive seed discharged through the calibration opening into the chute through the top opening and a bottom that slopes downwardly to one end locating a discharge opening through which collected seed is dispensed. The chute is supported on bag mounts of the implement from which a flexible calibration bag is otherwise suspended. A gate is operably associated with the discharge opening.

19 Claims, 4 Drawing Sheets

COLLECTION DEVICE FOR METER CALIBRATION OF AIR SEEDER TANKS

This application claims the benefit under 35 U.S.C. 119(e) of U.S. provisional application Ser. No. 63/051,429, filed Jul. 14, 2020.

FIELD OF THE INVENTION

The present invention relates to a collection device for collection of material discharged by a seed meter below the tank of an agricultural air seeder implement during calibration of the seed meter.

BACKGROUND

As most air seeder tanks are supported on an air seeder cart that comes from the factory a bag or some other catching apparatus has to be placed under the seed meter of each tank to catch the product as it is metered out of each tank through a calibration opening. Installing a bag requires the operator to reach under the seed meter, hook the bag to the opposite side of the meter and then tighten straps to keep the bag in place. Once the product has been metered out, the bag is removed and weighed. Removal and weighing of the bag can be very difficult and awkward if the sample is heavy. Once weighed the bag gets dumped into a container and the product is then carried up and dumped back into the tank.

The calibration opening can also be opened for cleaning out the seed meter. During a cleanout most people do not place anything under the seed meter to avoid dirtying or contaminating the bag used for calibration. This causes a mess as the seed or fertilizer is blown out of the bottom of the tanks using compressed air.

SUMMARY OF THE INVENTION

According to one aspect of the invention there is provided a collection device for use with a seed tank of an agricultural air seeder implement supported for movement across the ground in a forward working direction, the agricultural air seeder implement including a pneumatic delivery line for delivering seed, a seed meter for metering seed from the seed tank into the pneumatic delivery line, a calibration opening in the pneumatic delivery line through which seed can be dispensed during calibration of the seed meter, and a cover member for selectively closing the calibration opening, the collection device comprising:

a chute extending in a longitudinal direction of the chute between a first end and a second end;

a mounting arrangement arranged to support the chute below the calibration opening of the pneumatic delivery line such that the chute slopes downwardly and laterally outwardly to one side of the seed tank from the first end to the second end of the chute;

the chute including a top opening at a top side in alignment with the calibration opening thereabove so as to receive seed discharged through the calibration opening into the chute through the top opening; and the chute including a discharge opening at the second end through which seed collected in the chute is arranged to be discharged.

With this attachment fastened to the bottom of the air cart seed meter permanently it will catch all of the product as it is metered out during a calibration. A pail or some other suitable container can be placed under the lower funneled end of this attachment and filled to a desired level for weighing. The lower funneled end opens beside the seed meter so it is much more accessible for the operator without having to reach under the tank to install a bag etc. If the calibrated sample exceeds the capacity of the pail/container, the chute on this attachment can be closed off as it will hold a fair amount of product itself as a new pail/container is put in place.

Furthermore, during cleanout of the seed meter, with this attachment in place, the cleaned out product can once again be funneled into a suitable container for reuse or disposal without any mess on the ground.

Preferably the mounting arrangement is arranged to support the chute such that the chute slopes downwardly and outwardly towards an exterior boundary of the seed tank. The mounting arrangement may be further arranged to support the chute at a selected one of a plurality of different mounting orientations corresponding to different slopes of the chute.

Preferably the mounting arrangement is arranged to support the chute such that the longitudinal direction of the chute is oriented perpendicularly to the forward working direction of the implement.

The chute may comprise a pair side walls extending in the longitudinal direction of the chute and a bottom tapering downwardly and inwardly from each of the side walls at the second end of the chute.

When the implement comprises a plurality of pneumatic delivery lines having respective calibration openings in which the calibration openings are aligned in a row, the mounting arrangement is preferably arranged to support the chute such that the longitudinal direction of the chute is aligned with the row of calibration openings.

The collection device preferably further includes a gate member supported at the second end of the chute so as to be operable between open and closed positions of the gate member relative to the discharge opening at the second end of the chute. The gate member may be linearly slidable relative to the chute between the open and closed positions thereof. More particularly, the gate member may be movable upwardly and longitudinally outwardly from the closed position to the open position of the gate member.

The mounting arrangement supports the chute in a mounted position in fixed relation to the seed meter such that the chute does not interfere with attachment and removal of the cover relative to the calibration opening while the chute remains in the mounted position. The chute may include a pair side walls extending in the longitudinal direction of the chute, in which the side walls are spaced apart from one another so as to be arranged to receive the cover between the side walls when the cover is attached to the calibration opening.

When the implement comprises a plurality of bag mounts arranged to suspend a flexible calibration bag therefrom, the mounting arrangement may be arranged to support the chute wholly on the bag mounts of the implement. In this instance, the mounting arrangement may comprise a pair of crossbars extending laterally between longitudinally extending side walls of the chute, in which each crossbar is arranged to be engaged upon a respective pair of the bag mounts. Preferably at least one of the crossbars is releasably attached using threaded fasteners or a transverse retainer pin.

When the pair of crossbars include a first crossbar in proximity to a first end of the chute and a second crossbar in proximity to a second end of the chute, the second crossbar may be mountable in fixed relation to the chute at a selected one of a plurality of different mounting locations corresponding to different elevations of the second end of the chute relative to the implement.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Referring to the accompanying figures, there is illustrated a collection device generally indicated by reference numeral 10. The collection device 10 is particularly suited for use with an agricultural air seeder implement 12.

The implement 12 typically includes a seed drill frame towed across the ground by an agricultural tractor, and a seed cart frame 14 towed together with the seed drill frame that supports one or more seed tanks 16 thereon. Alternatively, the seed tanks 16 may be integrally supported with the seed drill such that a single frame assembly provides the function of both the seed drill frame and the seed cart frame. In either instance a frame 14 is supported for movement across the ground in a forward working direction of the implement for dispensing seed from the seed tanks into furrows formed in the ground as the frame is displaced forwardly during a seeding operation.

A plurality of pneumatic delivery lines 18 are supported on the frame 14 for carrying seed, or other particulate agricultural material, pneumatically from the seed tanks 16 to the air delivery system of the implement. In the illustrated embodiment, the delivery lines 18 are parallel and adjacent to one another so as to be oriented in the forward working direction while spanning in a generally common horizontal plane between longitudinally spaced apart seed tanks 16.

A seed meter 20 is associated with each seed tank 16 in which the seed meter 20 is received between the bottom end of the corresponding seed tank 16 and the delivery lines 18 therebelow. The metering mechanism of the seed meter is conventional and serves to meter portioned amounts of particulate material from the seed tank thereabove into each of the delivery lines 18 therebelow.

Each delivery line 18 includes an intake opening 22 at the top side thereof in open communication with each seed meter 20 to receive the portioned amount of particulate material from the corresponding seed tank thereabove. Each delivery line 18 also includes a calibration opening 24 in the bottom boundary of the delivery line in direct alignment with each intake opening 22 thereabove.

The calibration openings 24 are normally closed during normal operation of the implement such that any material dispensed into the product delivery lines 18 through the intake openings 22 thereof in communication with the seed meters is conveyed along the delivery line 18 by the airflow therethrough. For each seed tank 16, all of the calibration openings 24 in the delivery lines 18 that are associated with that seed tanks 16 are aligned in a respective row oriented in the lateral direction of the frame 14 such that the rows of calibration openings are perpendicular to the forward working direction.

The calibration openings 24 associated with each seed tanks 16 are all collectively closed by a single cover 26 associated with that seed tank. The cover 26 includes a base frame 28 spanning in the lateral direction of the frame 14 across all of the calibration openings 24 of the respective row, and a plurality of blocks 30 formed on the base frame 28 at laterally spaced apart positions for alignment with corresponding calibration openings 24 respectively. More particularly each block 30 has lateral and longitudinal dimensions which closely matches and fits within the respective calibration opening 24 to seal the calibration opening 24 closed in the closed position of the cover 26. Each block 30 includes a concave top face forming the shape of part of the inner surface of a cylinder so as to match the concave inner surface of the tubular delivery line 18 in the closed position.

The base frame 28 of the cover includes a main sheet 32 spanning the full width of the cover 26 in the lateral direction of the frame 14 between opposing ends 34 of the cover such that the main sheet 32 is generally horizontally oriented in the closed position of the cover. The base frame 28 also includes a pair of side flanges 36 depending downwardly from opposing side edges of the main sheet in the closed position to stiffen the main sheet 32.

The cover 26 is retained in the closed position spanning across the row of respective calibration openings 24 using a hook 38 at the first end of the cover 26 and a pair of releasable latches 40 at the opposing second end of the cover. The hook 38 extends downward from the frame 14 of the implement at the first end of the cover and includes a lower hooking portion extending laterally toward the opposing second end of the cover for being hooked under the bottom surface of the main sheet 32 at the first end thereof in the closed position. The releasable latches 40 are joined at the top end thereof on the frame 14 of the implement and depend downwardly to form releasable connections with mating connectors formed on the side flanges 36 respectively adjacent the second end of the cover. To remove the cover, the latches 40 are released to permit the second end of the cover to be displaced downwardly and laterally outwardly for releasing the first end of the cover from the hook 38.

Under normal use of the implement, the cover 26 remains mounted in place with the blocks 30 received within the respective calibration openings 24 such that the calibration openings remain closed and any material dispensed into the delivery lines 18 is conveyed along the lines to the distribution system of the implement which dispenses the material into respective furrows formed in the ground by the seed drill.

When calibration of the seed meters is desired, no air is conveyed through the delivery lines 18 and the cover is removed such that any material dispensed by the seed meter 20 into the product delivery lines 18 passes directly through the delivery line from the intake opening 22 at the top side thereof to the corresponding calibration opening 24 at the bottom side thereof.

During calibration, a flexible bag B is typically mounted below the calibration openings 24 for capturing the material dispensed from the seed meter. The bag is supported by a plurality of bag mounts 42 in which two bag mounts are fixed onto the frame 14 at laterally spaced apart positions relative to the frame along each side of the row of calibration openings 24 associated with each seed meter.

Each bag mount 42 comprises a depending rigid plate having an upper leg portion 44 of uniform dimension extending vertically downward from the frame and a lower flared portion 46 at the bottom end of each leg portion. The flared portion 46 has opposing side edges which diverge from one another and from the constant width of the upper leg portion so as to become wider towards the bottom end thereof. The flared portion thus forms a side edge of the depending plate which functions as a hook to retain a bag thereon.

More particularly the bag includes a perimeter strap surrounding an open top end of the bag from which the bag can be suspended. The strap is adjustable in circumference. By enlarging the circumference of the strap, the strap can be positioned above the flared portions 46 of the four bag mounts 42. Subsequent constricting of the circumference of the strap once positioned above the flared portions causes the strap to be secured about the upper leg portions 44 of the bag mounts. The increasing dimension of the flared portions prevents the constricted strap of the calibration bag from sliding down from the upper leg portions of the bag mounts, thus effectively retaining the bag on the bag mounts.

The collection device 10 is mounted on the frame 14 in association with a single seed tank 16 and seed meter 20. In some instances, a separate collection device can be mounted permanently in association with each of multiple seed tanks on the frame, or alternatively a single collection device can be releasably mounted on the frame 14 such that the collection device can be relocated from one seed tank 16 to another on the frame 14.

In each instance, the collection device 10 comprises (i) a chute 50 extending in a longitudinal direction between a first end 52 and an opposing second end 54, and (ii) a mounting arrangement 56 which supports the chute 50 such that a top opening of the chute is located below a row of calibration openings 24 associated with the respective seed tank 16, while the chute 50 slopes downwardly from the first end 52 to the second end 54 thereof for discharging any material collected in the chute from a discharge opening formed at the second end 54 of the chute. The chute is typically mounted on the frame 14 such that the longitudinal direction of the chute 50 is oriented perpendicularly to the forward working direction of the frame 14 so as to be oriented in the lateral direction of the frame 14.

The chute 50 in the illustrated embodiment comprises a pair of side walls 58 which are parallel to one another at opposing sides of the chute so as to extend in the longitudinal direction of the chute. The overall width of the chute is defined between the side walls 58 which are spaced apart sufficiently that the full width of the cover 26, including the latches 40 thereof can be received laterally between the side walls 58 of the chute. Furthermore, the side walls 58 are spaced apart from one another so as to also receive the bag mounts 42 at opposing sides of the row of calibration openings 24 between the side walls 58 as well such that the bag mounts are located in close proximity to the inner surfaces of the two side walls 58 respectively.

The side walls 58 are joined together at the bottom ends thereof by a bottom wall 60 which is curved to form part of the surface of a cylinder while extending downwardly from the first end 52 to the second end 54 of the chute. The bottom wall 60 thus tapers downwardly and laterally inwardly from both of the side walls 58 to a bottom apex of the bottom wall which is laterally centred between the side walls 58. The side walls 58 are taller at the second end 54 thereof such that the bottom wall 60 is sloped downwardly in the longitudinal direction when the top edges of the side walls 58 are joined to the frame in a generally horizontal orientation.

A handle bar 61 is connected laterally between the side walls 58 at the second end 54 of the chute at a location spaced above the bottom wall 60 of the chute so as to provide lateral support between the side walls without interfering with the discharge of material from the second end 54 of the chute. The bottom wall 60 is recessed longitudinally inwardly relative to the handle bar 61 at the second end of the chute to further ensure there is no interference of the handle bar with the discharge of material from the second end of the chute. The handle bar 61 is also arranged to be readily gripped in a hand of a user to assist in positioning the chute relative to the implement when mounting the collection device on the implement.

In the illustrated embodiment, the chute is supported on the frame 14 by being wholly supported on the bag mounts 42 of the implement. More particularly, two crossbars 62 are mounted between the side walls 58 perpendicularly to the longitudinal direction of the chute in proximity to the first end 52 and the second end 54 respectively. The spacing in the longitudinal direction of the chute between the two crossbars 52 is approximately equal to the external dimension between the opposed outer edges 64 of the leg portions 44 of the bag mounts 42 along each side of the row of calibration openings 24. In this manner, the crossbars 62 can be mounted to extend between the side walls 58 at a location immediately above the flared portions 46 of the bag mounts to be retained above the flared portions which function as hooks to retain the mounted chute thereon similarly to the mounting of the calibration bag.

Each crossbar 62 may include a bushing 66 supported thereon adjacent the inner side of each of the two side walls 58. The bushings 66 may be formed of a material which is more resilient than the rigid metal of the side walls 58, the bag mounts 42, and the crossbars 62 so as to form a firm connection between the crossbars and the bag mounts by being engaged upon the flared portions 46 of the bag mounts while accommodating minor variations in tolerances between the bag mounts and the spacing of the crossbars.

Figure 8:
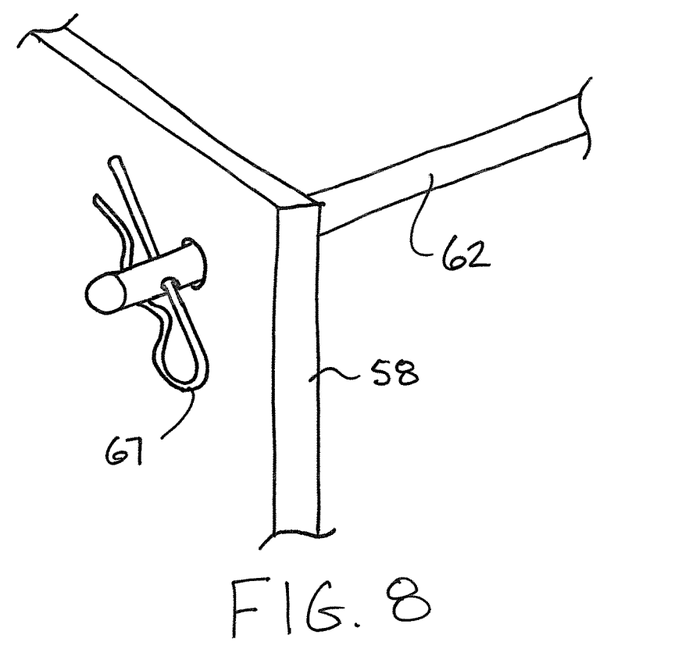
FIG. 8 is a schematic representation of an alternative mounting arrangement to support the collection device on an implement.

Alternatively, the crossbars 62 can be mounted without bushings as shown in FIG. 8. Furthermore, the side walls may be formed of a molded plastic material which is suitably durable to resist wear.

In the first illustrated embodiment of FIGS. 1 to 7, each crossbar 62 comprises a threaded shaft having a head or threaded nut at a first end for engaging the outer side of one of the side walls, and a nut threaded onto the shaft at the opposing end for engaging the outer side of the other side wall 58. The shaft of the crossbar 62 passes through corresponding mounting apertures in the side walls 58. The bushings 66 on the shaft are retained adjacent the inner surface of each side wall 58 by additional nuts threaded onto the shaft at the inner sides of each bushing. Releasing the threading of the nuts from the threaded shaft allows the threaded shaft to be removed from the side walls which in turn enables the chute to be removed from the bag mounts 42 for removal from the implement if desired. Removal of only one crossbar is sufficient to remove the chute from the frame 14 of the implement.

If providing a single chute associated with each seed meter 20 on the frame 14, the chute may be left mounted in place permanently on the implement. The spacing between the side walls 58 of the chute and the spacing of the bottom wall 60 below the closed cover 26 is sufficient that the chute does not interfere with movement of the cover 26 between the closed position and the open position thereof. Accordingly the latches 40 of the cover can be released and the cover can be pivoted downwardly for releasing from the hook 38 subsequent to release of the latches 44 for removing the cover all while the chute remains mounted in place on the frame 14.

In a further embodiment according to FIG. 8, when it is desirable that a single chute be re-positioned for alignment with different seed meters along the frame 14, the crossbars 62 may be smooth rods that include transverse apertures formed therein in alignment with the outer sides of the side walls so that insertion of transverse pins 67 through the crossbars retains the crossbars in the mounted position on the bag mounts instead of threaded nuts; whereby, simply removing the transverse pins permits the crossbars to be slidably removed for more quickly dismounting the chute from the implement.

The collection device 10 in the illustrated embodiment further includes a gate member 68 supported at the second end of the chute for operation between open and closed positions relative to the discharge opening of the chute. The gate member 68 comprises a flat panel of rigid material which is oriented to extend at an upward and outward slope away from the first end of the chute in the closed position. A bottom edge of the gate member 68 is curved to match the curvature of the bottom wall 60 while the overall width of the gate member between opposing side edges thereof is approximately equal to the interior width between the side walls 58 for fully closing the chute at the second end thereof in the closed position of the gate member.

Two tracks 70 are mounted on the inner surfaces of the two side walls 58 respectively for receiving opposing side edges of the gate member 68 slidably therein. Each track comprises a pair of flanges spaced apart by the thickness of the gate member to receive the gate member therebetween while projecting perpendicularly inwardly from the corresponding side wall of the chute. The tracks are sloped upwardly and outwardly away from the first end of the chute to match the corresponding slope of the gate member in the closed position. The gate member is slidable relative to the tracks such that the gate member is linearly displaced upwardly and laterally outwardly away from the first end of the chute from the closed position to the open position thereof. In the open position, a gap is formed between the bottom edge of the gate member 68 and the bottom wall of the chute to define the discharge opening at the second end of the chute which is adjustable in cross-sectional area depending upon the position of the gate member between the open and closed positions thereof.

In the mounted position of the chute on the implement, the longitudinal direction of the chute extends in the lateral direction of the frame 14 for alignment with the row of calibration openings 24 of the corresponding seed meter. The chute is fully open at the top side thereof along the full length and across the full width between the side walls 58 for capturing all material dispensed through the calibration openings when the cover 26 is removed for calibration. During calibration, the gate member 68 can be initially closed so that material is initially collected within the interior volume of the chute 50. By placing a bucket or suitable container directly below the second end of the chute 50 followed by opening of the gate member, any collected material within the chute will be controllably discharged into the auxiliary bucket or container. If the container becomes full, the container can be readily interchanged without any spillage or loss of collection of material dispensed from the seed meter by closing the gate member 68 while the full bucket is removed and a new empty bucket is placed below the second end of the chute. Opening of the gate member 68 will then allow continued discharge of material into the subsequent bucket. When the calibration process is complete, the cover 26 of the implement can be closed and the chute left in the mounted position with the gate member either closed or removed so that the discharge opening is left open.

During cleanout operations, the chute can be similarly used for collecting any material discharged through the open calibration openings 24 when the cover 26 is removed. The smooth interior surfaces of the chute capture any material discharged from the seed meter while remaining easy to clean out into any desired container placed below the second end of the chute.

Figure 1:
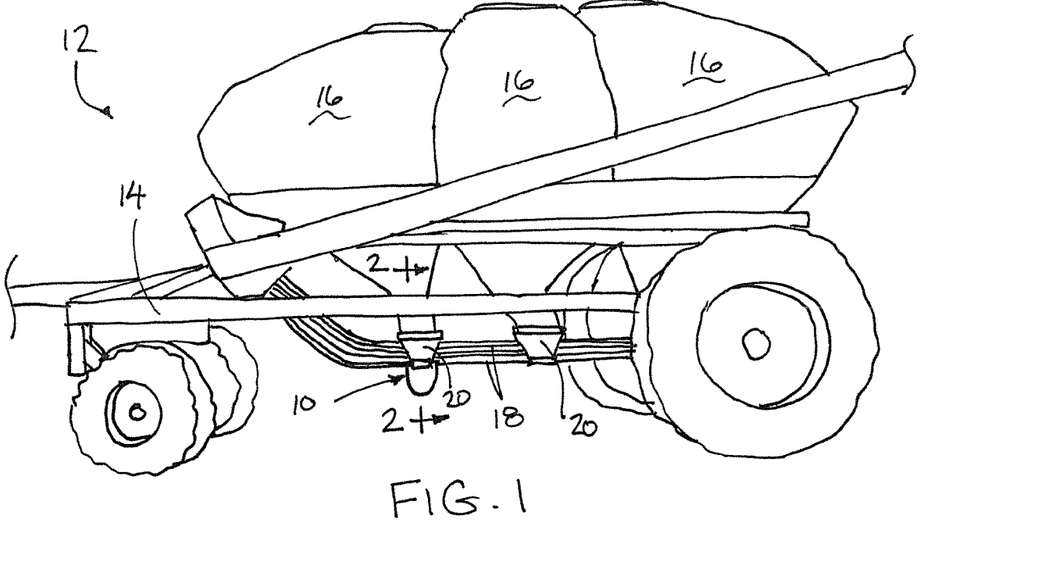
FIG. 1 is a side view of the collection device according to the present invention supported on an exemplary air seeder cart.
Figure 2:
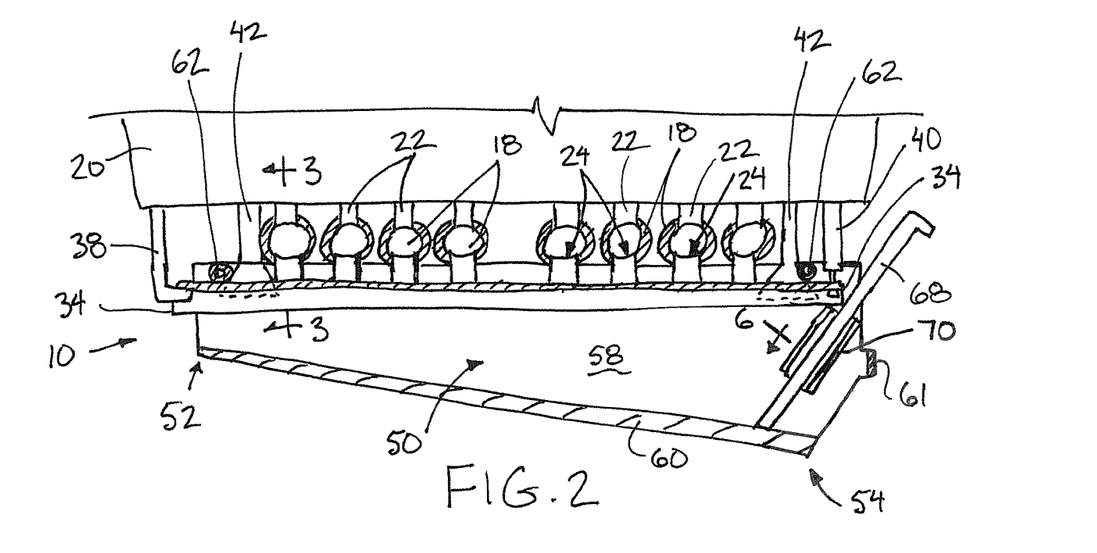
FIG. 2 is a section view along the line 2-2 in FIG. 1.
Figure 3:
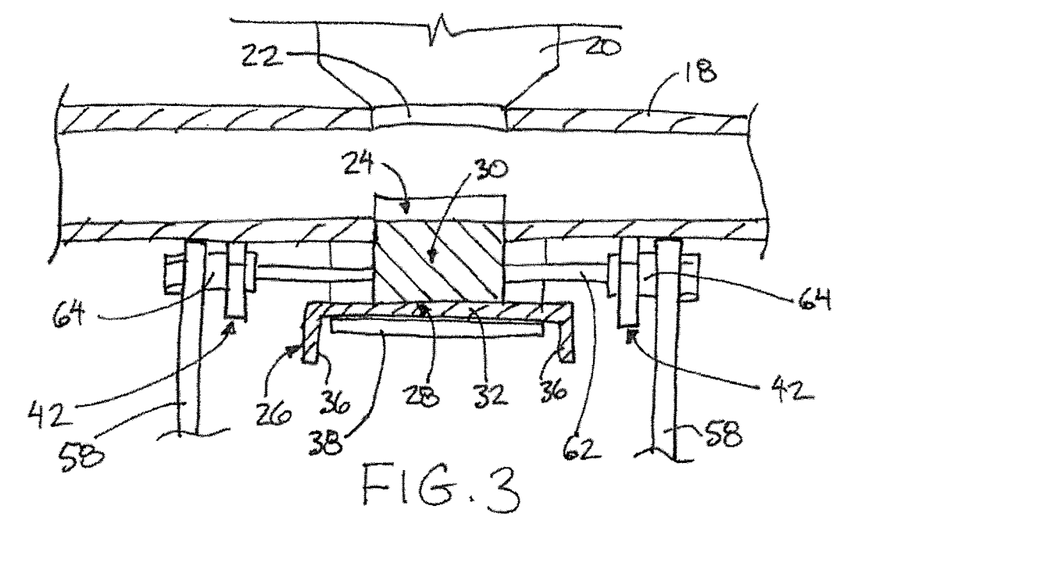
FIG. 3 is a sectional view along the line 3-3 in FIG. 2.
Figure 4:
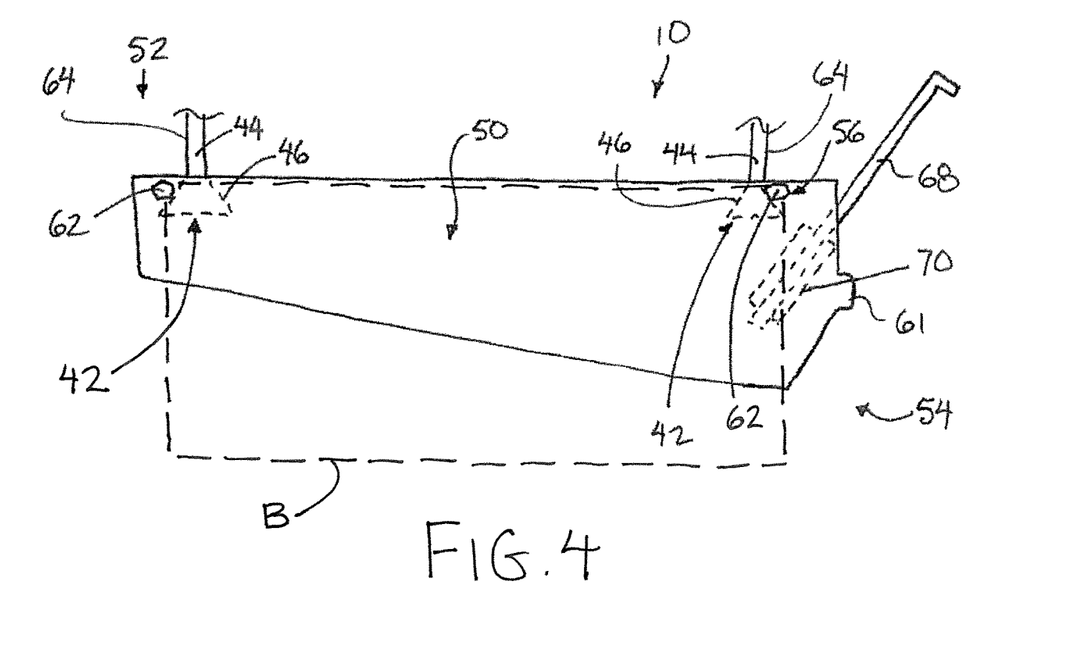
FIG. 4 is an elevational view of one side of the collection device in relation to mounts on the air seeder cart.
Figure 5:
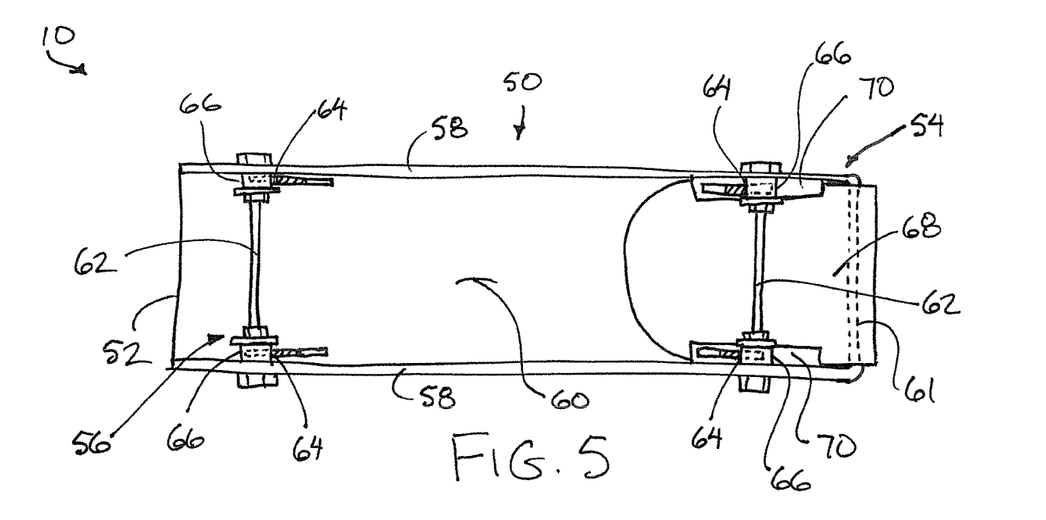
FIG. 5 is a top plan view of the collection device.
Figure 6:
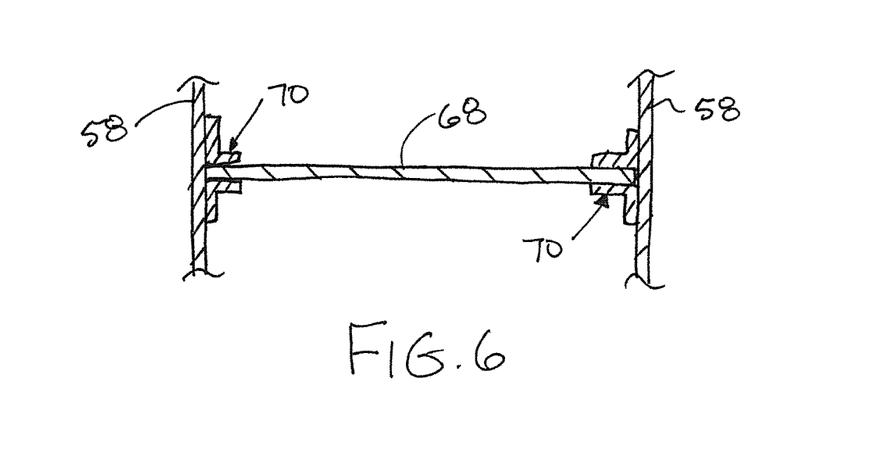
FIG. 6 is a sectional view along the line 6-6 in FIG. 2.
Figure 7:
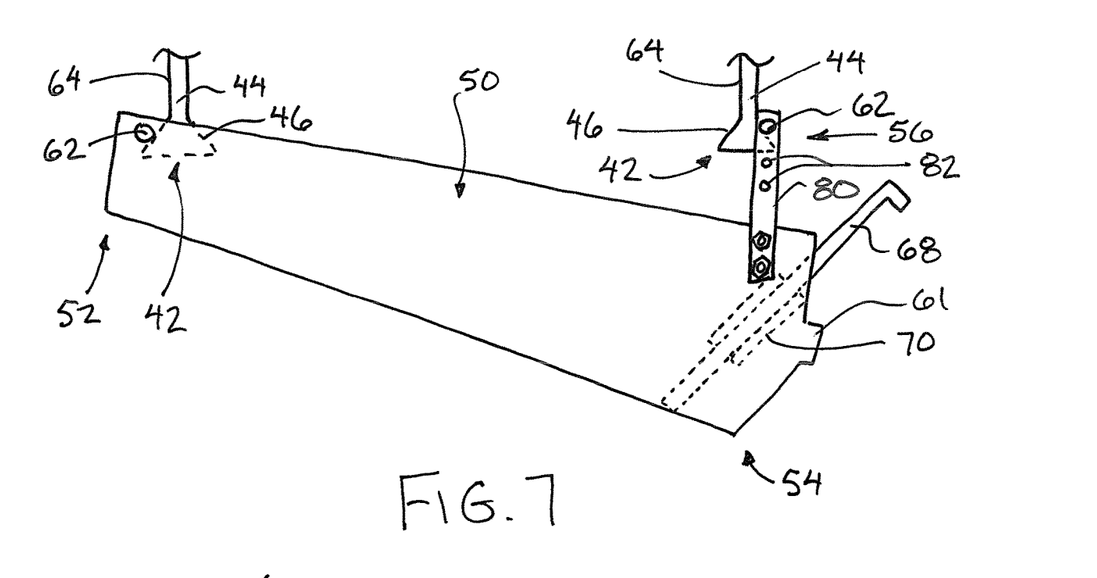
FIG. 7 is an elevational view of one side of the collection device according to FIG. 1 using an alternative mounting arrangement to secure the collection device to the mounts on the air seeder cart.

In a further arrangement as shown in FIG. 7, an additional bracket member 80 may be mounted on each side wall 58 adjacent the second end 54 of the chute 50 in which the bracket members mount the crossbar 62 at the second end of the chute at a selected one of multiple mountings locations 82 spaced above the top edge of the side walls at the second end by various amounts. The crossbar 62 remains mounted onto the bag mounts of the implement in the same manner described above. The different mounting locations thus correspond to mounting of the second end of the chute at different heights relative to the implement, which in turn corresponds to different slopes of the chute. The chute can thus be adjusted to vary the overall height as desired, while also ensuring sufficient slope is provided to fully cleanout the chute by action of gravity alone.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A collection device for use with a seed tank of an agricultural air seeder implement supported for movement across the ground in a forward working direction, the agricultural air seeder implement including a pneumatic delivery line for delivering seed, a seed meter for metering seed from the seed tank into the pneumatic delivery line, a calibration opening in the pneumatic delivery line through which seed can be dispensed during calibration of the seed meter, and a cover member for selectively closing the calibration opening, the collection device comprising:
   a chute extending in a longitudinal direction of the chute between a first end and a second end; and
   a mounting arrangement arranged to support the chute below the calibration opening of the pneumatic delivery line such that the chute slopes downwardly from the first end to the second end of the chute in a mounted position;
   the chute including a top opening at a top side of the chute in which the top opening is arranged for alignment with the calibration opening thereabove in the mounted position so as to receive seed discharged through the calibration opening into the chute through the top opening;

the chute including a discharge opening at the second end through which seed collected in the chute is arranged to be discharged; and the mounting arrangement being arranged to support the chute such that the chute slopes downwardly and outwardly towards an exterior boundary of the seed tank.

2. The collection device according to claim 1 wherein the mounting arrangement is arranged to support the chute at a selected one of a plurality of different mounting orientations corresponding to different slopes of the chute.

3. The collection device according to claim 1 wherein the mounting arrangement is arranged to support the chute such that the longitudinal direction of the chute is oriented perpendicularly to the forward working direction of the implement.

4. The collection device according to claim 1 wherein the chute comprises a pair side walls extending in the longitudinal direction of the chute and a bottom tapering downwardly and inwardly from each of the side walls at the second end of the chute.

5. The collection device according to claim 1 wherein the implement comprises a plurality of pneumatic delivery lines having respective calibration openings in which the calibration openings are aligned in a row, the mounting arrangement being arranged to support the chute such that the longitudinal direction of the chute is aligned with the row of calibration openings.

6. The collection device according to claim 1 further comprising a gate member supported at the second end of the chute so as to be operable between open and closed positions of the gate member relative to the discharge opening at the second end of the chute.

7. The collection device according to claim 1 wherein the mounting arrangement is arranged to support the chute in the mounted position in fixed relation to the seed meter such that the chute does not interfere with attachment and removal of the cover relative to the calibration opening while the chute remains in the mounted position.

8. The collection device according to claim 7 wherein the chute comprises a pair side walls extending in the longitudinal direction of the chute, the side walls being spaced apart from one another so as to be arranged to receive the cover between the side walls when the cover is attached to the calibration opening.

9. The collection device according to claim 1 wherein the implement comprises a plurality of bag mounts arranged to suspend a flexible calibration bag therefrom, the mounting arrangement being arranged to support the chute wholly on the bag mounts of the implement.

10. A collection device for use with a seed tank of an agricultural air seeder implement supported for movement across the ground in a forward working direction, the agricultural air seeder implement including a pneumatic delivery line for delivering seed, a seed meter for metering seed from the seed tank into the pneumatic delivery line, a calibration opening in the pneumatic delivery line through which seed can be dispensed during calibration of the seed meter, a cover member for selectively closing the calibration opening, and a plurality of bag mounts arranged to suspend a flexible calibration bag therefrom, the collection device comprising:

a chute extending in a longitudinal direction of the chute between a first end and a second end; and a mounting arrangement arranged to support the chute below the calibration opening of the pneumatic delivery line such that the chute slopes downwardly from the first end to the second end of the chute in a mounted position;

the chute including a top opening at a top side of the chute in which the top opening is arranged for alignment with the calibration opening thereabove in the mounted position so as to receive seed discharged through the calibration opening into the chute through the top opening;

the chute including a discharge opening at the second end through which seed collected in the chute is arranged to be discharged; and the mounting arrangement being arranged to support the chute wholly on the bag mounts of the implement.

11. The collection device claim 10 wherein the mounting arrangement comprises a pair of crossbars extending laterally between longitudinally extending side walls of the chute, each crossbar being arranged to be engaged upon a respective pair of the bag mounts.

12. The collection device according to claim 11 wherein at least one of the crossbars is releasably attached using threaded fasteners.

13. The collection device according to claim 11 wherein at least one of the crossbars is releasably attached using a transverse retainer pin.

14. The collection device according to claim 11 wherein the pair of crossbars include a first crossbar in proximity to a first end of the chute and a second crossbar in proximity to a second end of the chute, the second crossbar being mountable in fixed relation to the chute at a selected one of a plurality of different mounting locations corresponding to different elevations of the second end of the chute relative to the implement.

15. A collection device for use with a seed tank of an agricultural air seeder implement supported for movement across the ground in a forward working direction, the agricultural air seeder implement including a pneumatic delivery line for delivering seed, a seed meter for metering seed from the seed tank into the pneumatic delivery line, a calibration opening in the pneumatic delivery line through which seed can be dispensed during calibration of the seed meter, and a cover member for selectively closing the calibration opening, the collection device comprising:

a chute extending in a longitudinal direction of the chute between a first end and a second end;

a mounting arrangement arranged to support the chute below the calibration opening of the pneumatic delivery line such that the chute slopes downwardly from the first end to the second end of the chute in a mounted position; and a gate member supported at the second end of the chute;

the chute including a top opening at a top side of the chute in which the top opening is arranged for alignment with the calibration opening thereabove in the mounted position so as to receive seed discharged through the calibration opening into the chute through the top opening;

the chute including a discharge opening at the second end through which seed collected in the chute is arranged to be discharged; and the gate member being operable between open and closed positions of the gate member relative to the discharge opening at the second end of the chute.

16. The collection device according to claim 15 wherein the gate member is linearly slidable relative to the chute between the open and closed positions thereof.

17. The collection device according to claim 15 wherein the gate member is movable upwardly and longitudinally outwardly from the closed position to the open position of the gate member.

18. A collection device for use with a seed tank of an agricultural air seeder implement supported for movement across the ground in a forward working direction, the agricultural air seeder implement including a pneumatic delivery line for delivering seed, a seed meter for metering seed from the seed tank into the pneumatic delivery line, a calibration opening in the pneumatic delivery line through which seed can be dispensed during calibration of the seed meter, and a cover member for selectively closing the calibration opening, the collection device comprising:
- a chute extending in a longitudinal direction of the chute between a first end and a second end; and
- a mounting arrangement arranged to support the chute below the calibration opening of the pneumatic delivery line such that the chute slopes downwardly from the first end to the second end of the chute in a mounted position;
- the chute including a top opening at a top side of the chute in which the top opening is arranged for alignment with the calibration opening thereabove in the mounted position so as to receive seed discharged through the calibration opening into the chute through the top opening;
- the chute including a discharge opening at the second end through which seed collected in the chute is arranged to be discharged; and
- the mounting arrangement being arranged to support the chute at a selected one of a plurality of different mounting orientations corresponding to different slopes of the chute.

19. A collection device for use with a seed tank of an agricultural air seeder implement supported for movement across the ground in a forward working direction, the agricultural air seeder implement including a pneumatic delivery line for delivering seed, a seed meter for metering seed from the seed tank into the pneumatic delivery line, a calibration opening in the pneumatic delivery line through which seed can be dispensed during calibration of the seed meter, and a cover member for selectively closing the calibration opening, the collection device comprising:
- a chute extending in a longitudinal direction of the chute between a first end and a second end; and
- a mounting arrangement arranged to support the chute below the calibration opening of the pneumatic delivery line such that the chute slopes downwardly from the first end to the second end of the chute in a mounted position;
- the chute including a top opening at a top side of the chute in which the top opening is arranged for alignment with the calibration opening thereabove in the mounted position so as to receive seed discharged through the calibration opening into the chute through the top opening;
- the chute including a discharge opening at the second end through which seed collected in the chute is arranged to be discharged; and
- the mounting arrangement being arranged to support the chute such that the longitudinal direction of the chute is oriented perpendicularly to the forward working direction of the implement.

* * * * *